(12) United States Patent
Appler et al.

(10) Patent No.: US 8,065,884 B2
(45) Date of Patent: *Nov. 29, 2011

(54) COMPOSITION AND METHODS FOR INJECTION OF SEALANTS INTO AIR CONDITIONING AND REFRIGERATION SYSTEMS

(75) Inventors: Paul Appler, Windsor (CA); George E. Cranton, London (CA); Jack Brass, North York (CA)

(73) Assignee: Brasscorp Limited (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/941,364

(22) Filed: Nov. 16, 2007

(65) Prior Publication Data

US 2008/0060377 A1    Mar. 13, 2008

Related U.S. Application Data

(63) Continuation of application No. 10/860,646, filed on Jun. 4, 2004, now Pat. No. 7,296,423.

(51) Int. Cl.
*F25B 45/00* (2006.01)
(52) U.S. Cl. .............................................. 62/77; 62/292
(58) Field of Classification Search ................ 62/77, 85, 62/114, 177, 292, 298, 468; 252/67, 68, 252/78.3, 194; 160/33
See application file for complete search history.

(56) References Cited

U.S. PATENT DOCUMENTS

| | | | |
|---|---|---|---|
| 2,185,332 A | 1/1940 | Crampton | |
| 3,580,939 A | 5/1971 | Ceyzeriat et al. | |
| 3,663,138 A * | 5/1972 | Petroff | 408/130 |
| 3,943,987 A | 3/1976 | Rossi | |
| 4,237,172 A | 12/1980 | Packo et al. | |
| 4,304,805 A | 12/1981 | Packo et al. | |
| 4,331,722 A | 5/1982 | Packo et al. | |
| 4,379,067 A | 4/1983 | Packo et al. | |
| 4,508,631 A | 4/1985 | Packo et al. | |
| 4,537,214 A * | 8/1985 | Cowan | 137/318 |
| 4,745,772 A | 5/1988 | Ferris | |

(Continued)

FOREIGN PATENT DOCUMENTS

DE   19812819 A1   9/1990

(Continued)

OTHER PUBLICATIONS

International Preliminary Report on Patentability for PCT/CA2005/000846 dated Oct. 18, 2006.

(Continued)

*Primary Examiner* — Mohammad Ali
(74) *Attorney, Agent, or Firm* — Katten Muchin Rosenman LLP

(57) ABSTRACT

The use of sealants based on organosilanes for refrigeration and air conditioning systems is made possible by control of the rate of introduction and viscosity of the sealant mixture within certain ranges. An appropriate choice of organosilane sealant is made to allow effective sealing of small pinhole size leaks in the air conditioning or refrigeration system. The organosilane is then combined with a miscible lubricant at particular ratios to provide the proper mixture viscosity for injection into the refrigerant system to prevent bearing seizure. Specific orifice sizes are selected for an apparatus to ensure that the composition is injected at the flow rates required to prevent liquid slugging and subsequent compressor shutdown or failure. In addition, effective introduction of the mixture requires certain procedures be performed. Injection procedures are also described that prevent temporary or catastrophic equipment shutdown.

30 Claims, 2 Drawing Sheets

U.S. PATENT DOCUMENTS

| | | | |
|---|---|---|---|
| 4,938,063 A | | 7/1990 | Leighley |
| 5,015,782 A | | 5/1991 | Harandi |
| 5,070,917 A | | 12/1991 | Ferris et al. |
| 5,167,140 A | * | 12/1992 | Cooper et al. ............ 73/40.7 |
| 5,417,873 A | | 5/1995 | Packo |
| 5,436,356 A | | 7/1995 | Drent et al. |
| 5,440,919 A | | 8/1995 | Cooper |
| 5,540,254 A | * | 7/1996 | McGowan et al. ...... 137/315.01 |
| 5,842,349 A | * | 12/1998 | Wakita et al. .............. 62/85 |
| 5,882,543 A | | 3/1999 | Peterson et al. |
| 5,975,151 A | | 11/1999 | Packo |
| 5,996,651 A | | 12/1999 | Scaringe |
| 5,999,700 A | * | 12/1999 | Geers ........................ 392/441 |
| 6,089,032 A | * | 7/2000 | Trachtenberg .............. 62/149 |
| 6,183,663 B1 | | 2/2001 | Kalley et al. |
| 6,261,474 B1 | * | 7/2001 | Egawa et al. ................ 252/68 |
| 6,378,328 B1 | * | 4/2002 | Cholkeri et al. ............ 62/528 |
| 6,385,986 B1 | * | 5/2002 | Ferris et al. ................ 62/292 |
| 6,457,606 B1 | | 10/2002 | Burke |
| 6,698,235 B2 | * | 3/2004 | Nobuta et al. .............. 62/509 |
| 6,722,141 B2 | | 4/2004 | Ferris et al. |
| 6,807,976 B2 | | 10/2004 | Knowles |
| 6,851,442 B2 | | 2/2005 | Knowles et al. |
| 2005/0208187 A1 | * | 9/2005 | Kowalski ................... 426/281 |
| 2005/0268642 A1 | | 12/2005 | Appeler et al. |

FOREIGN PATENT DOCUMENTS

WO 02/073102 A1 9/2002

OTHER PUBLICATIONS

International Search Report for PCT/CA2005/000846 dated Oct. 3, 2005.

Written Opinion of the International Search Authority for PCT/CA2005/000846 dated Oct. 3, 2005.

International Search Report for PCT/US2002/06597 dated Jul. 15, 2002.

International Search Report for PCT/CA2009/001264 dated Dec. 23, 2009.

Written Opinion of the International Search Authority for PCT/CA2009/001264 dated Dec. 23, 2009.

International Preliminary Report on Patentability for PCT/CA2009/001264 dated Mar. 15, 2011.

* cited by examiner

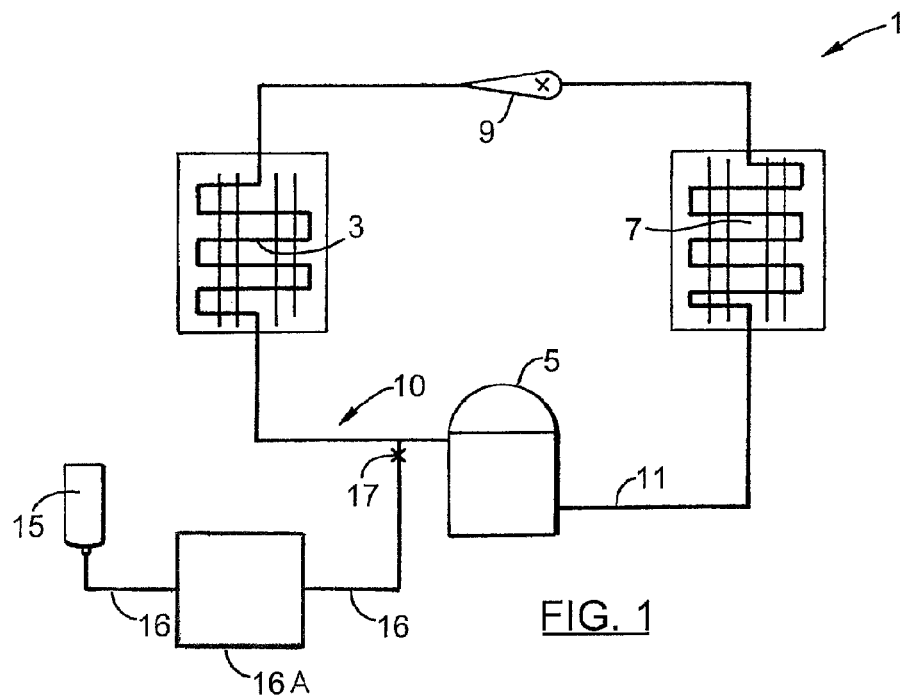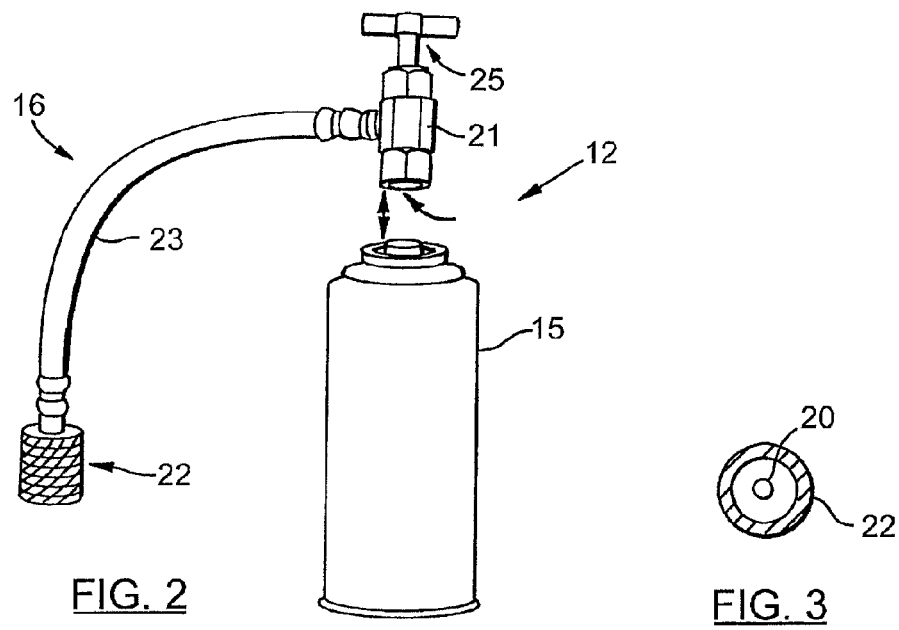

COMPOSITION AND METHODS FOR INJECTION OF SEALANTS INTO AIR CONDITIONING AND REFRIGERATION SYSTEMS

CROSS-REFERENCE TO RELATED APPLICATIONS

This is a continuation of U.S. patent application Ser. No. 10/860,646 entitled COMPOSITION AND METHODS FOR INJECTION OF SEALANTS INTO AIR CONDITIONING AND REFRIGERATION SYSTEMS filed Jun. 4, 2004, the content of which is hereby incorporated by reference into the detailed description hereof.

FIELD OF THE INVENTION

The general field of the invention is the injection of sealant into refrigeration and air conditioning systems by means of suitable selection of sealant, mixtures, equipment and procedures to seal small leaks that develop in the system.

BACKGROUND OF THE INVENTION

Organosilanes have been marketed successfully as automotive air conditioning (A/C) system sealants for several years. Their use is targeted at small pinhole leaks that develop over time, allowing escape of refrigerant. Leaks lead to loss of efficiency for the a/c system as well as undesirable release of refrigerant gas to the environment. The application of these sealants to hermetically sealed systems used in non-automotive a/c systems and in refrigeration systems has been less widespread. In these applications, sealant injection often leads to compressor shutdown due to bearing seizure. At least one sealant manufacturer recommends the use of a "hard-start kit" apparently to overcome this issue.

It is desirable to develop alternative products and methods for the introduction of sealant into air conditioning and refrigeration systems.

SUMMARY OF THE INVENTION

In a first aspect the invention provides a method for injecting sealant into an air conditioning or refrigeration system having a compressor, a high pressure side ("high side"), and a low pressure side ("low-side"). The method includes injecting the sealant in a quantity to provide sufficient lubrication to maintain proper operation of the compressor when the sealant is fully distributed in the system, and injecting the sealant so as to maintain proper operation of the compressor before the sealant is fully distributed in the system.

The sealant may be injected at the high side of the system so as to maintain proper operation of the compressor before the sealant is fully distributed by distributing the sealant starting at the high side. The injected sealant may be injected at a rate of less than 6% per minute of lubricant within the system.

The sealant may be injected at a controlled rate so as to maintain proper operation of the compressor before the sealant is fully distributed in the system.

The sealant may be injected into a non-operating system under vacuum, and other system contents, including refrigerant, are later injected into the system causing distribution of the previously injected sealant. Approximately 60% of total system refrigerant may be injected after the sealant.

The sealant may be injected as a part of a fluid mixture, and the mixture further comprises one or more of lubricant, drying agent, corrosion/rust inhibitor, antiwear agent, fluorescent or phosphorescent dye.

The sealant may be an organosilane. The organosilane may be a monomer capable of forming a solid polymer with itself or other chosen organosilanes in the presence of moisture, and is stable in the absence of moisture, and does not substantially interfere with the normal operation of other contents of the system in selected quantities.

The sealant may be part of a fluid mixture further comprising a lubricant. The lubricant may be an oil, the compressor may have a sump containing oil, and the minimum viscosity of the injected fluid mixture may be $\eta_{inj}$ as determined by:

$$\exp(x_{inj} \cdot \ln \eta_{inj} + x_{sump} \cdot \ln \eta_{sump} + C) \geq Fr \cdot \eta_{sump}$$

where, ln is the natural logarithm and exp is the exponential, $x_{inj}$, is mole fraction of injected material in final sump mixture, $x_{sump}$ is mole fraction of original sump oil in final sump mixture, $\eta_{inj}, \eta_{sump}$ are viscosities of the injected material and original sump oil respectively, and Fr is a desired fraction of original sump oil viscosity to be maintained.

Fr may be equal to approximately 0.9 or more.

The viscosity of the mixture may be not less than 7 CST@40° C.

In a second aspect the invention provides a method of introducing sealant into an air conditioning or refrigeration system having a compressor and evaporator. The method includes connecting a vessel containing a sealant mixture comprising an organosilane between the compressor and the evaporator, and while the system is running, allowing the sealant mixture to enter the system at a rate to prevent liquid slugging and to maintain sufficient concentrations of lubricant for proper operation of the compressor during the injection process, allowing the sealant to enter the system in an amount to maintain sufficient compressor lubricant viscosity for continued proper operation of the compressor, and allowing the sealant to enter in an amount that will allow continued proper operation of the air conditioning or refrigeration system.

In either aspect the sealant may be one or more of an organosilane and a polymeric latex consisting of one or more of a vinyl acetate, methacrylate, nitrite, epoxide and styrene polymer. The mixture may also include one or more of an accelerant and a catalyst.

The sealant mixture may be allowed to enter the system by pressurizing the sealant mixture sufficiently above system low side operating pressure to cause the sealant mixture to enter the system from the vessel when the system is running. Pressurizing the sealant mixture may include using the system pressure of the system in a non-running state to pressurize the sealant mixture in the vessel.

The method may also include allowing the sealant mixture to cool to near ambient temperature after the vessel is pressurized and while the vessel is fluidly connected to the system in the non-running state. The method may also include fluidly disconnecting the pressurized vessel from the system after cooling, running the system until low side pressure drops, and fluidly connecting the vessel to the low side of the system and allowing the sealant to enter the system as provided above.

In a third aspect the invention provides a method of introducing sealant into an air conditioning or refrigeration system having a compressor and an evaporator. The method includes turning off the system; allowing system pressure to equalize; connecting a vessel containing a sealant mixture comprising an organosilane between the compressor and the evaporator, and while the system is running, allowing the sealant mixture to enter the system at a rate to prevent liquid slugging and to maintain sufficient concentrations of lubricant for proper operation of the compressor. The organosilane is a monomer capable of forming a solid polymer with itself or other chosen organosilanes in the presence of moisture, and is stable in the absence of moisture in the system, and does not substantially interfere with the normal operation of contents of the system in selected quantities.

The step of connecting the vessel may include providing fluid connection between the vessel and the system, and the method may further include allowing sufficient time for the sealant mixture to achieve ambient temperature before running the system after fluid connection.

The method may further include turning off the system when a selected amount of sealant mixture has entered the system for a period of time to allow system pressure to equalize, and repeatedly allowing the sealant mixture to enter the system as specified above and turning off the system to allow pressure to equalize as set out above, until a total selected amount of sealant has entered the system. The method may include equilibrating the system after injecting the approximately 60% of the refrigerant then turning on the system and adding remaining refrigerant.

The sealant mixture may have a viscosity above 7 cst. when measured at 40° C. The flow rate of injection may be 6 cc/sec or less.

The viscosity for a particular lubricant/sealant mixture may be $\eta_{inj}$ or greater where $\eta_{inj}$ is determined by:

$$\exp(x_{inj} \cdot \ln \eta_{inj} + x_{sump} \cdot \ln \eta_{sump} + C) \geq Fr \cdot \eta_{sump}$$

where, ln is the natural logarithm and exp is the exponential, $x_{inj}$, is mole fraction of injected material in final sump mixture, $x_{sump}$ is mole fraction of original sump oil in final sump mixture, $\eta_{inj}$, $\eta_{sump}$ are viscosities of the injected mixture and original sump oil respectively, and Fr is a desired fraction of original sump oil viscosity to be maintained.

Fr may be equal to 0.9 or more. Where the calculated viscosity may be less than 7 cst., then the minimum viscosity may be set at 7 cst.

The step of allowing the sealant to enter the system may further include allowing the sealant to enter through an orifice having an opening within a range of from 0.020-0.06 inches diameter.

The step of connecting the vessel to the system may include connecting a hose assembly between the vessel and a low pressure side service port of the system. The hose assembly may include a first fitting for connection to the vessel and a second fitting for connection to the port.

The step of providing fluid connection between the vessel and the system, and the step of allowing sealant mixture to enter the system, may include opening a valve in the second fitting.

The vessel may be a sealed canister, and the step of providing a fluid connection between the canister and the system may include tapping the canister before opening the valve in the second fitting.

The second fitting may be a can-tapper. The method may also include substantially evacuating the hose assembly prior to connection to the system.

In a fourth aspect the invention provides a device for introducing sealant into a hermetically sealed air conditioning or refrigeration system. The device includes a sealed vessel including an organosilane mixture of an organosilane and a miscible material, the mixture having a viscosity above 7 cst. when measured at 40° C. In this aspect the organosilane is a monomer or oligomer capable of forming a solid polymer with itself or other chosen organosilanes in the presence of moisture, and is stable in the absence of moisture in the system, and does not substantially interference with the normal operation of contents of the system in selected quantities.

The device may include a metering device for fluid connection with the sealed vessel, and for controlling fluid flow from the sealed vessel. The metering device may be an orifice having an opening within a range of from 0.020-0.06 inches.

The device may further include a fitting for sealed fluid connection to a low side port of the system, and the fluid flowing through the metering device also flows through the fitting. The device may also include a hose assembly with a first fitting for sealed fluid connection to a low side port of the system, and a sealed fluid connection to the sealed vessel.

The device may also include a metering device for controlling fluid flow from the sealed vessel through the hose assembly.

The fluid connection to the sealed vessel may be a second fitting. The second fitting may include a manually operable valve for providing fluid connection between the hose assembly and the sealed vessel. The second fitting may include a can-tapper for opening the sealed vessel.

The device may include a filter is placed between the fitting connecting to the system and the orifice. The orifice may have a diameter of 0.06 inches or less. The sealed vessel may be a sealed canister.

The organosilane or components of the sealant mixture may include components that can be represented as $(R_1)(R_2)Si(R_3)(R_4)$ where, $R_1$=is an alkyl radical of 1-4 carbon atoms or vinyl or —OH $R_2$ is $R_1$ or —$OR_1$, or —$NH(R_1)$ or —$N(R_1)_2$ or —$R_1NHR_1NH_2$, $R_3$ is $R_1$ or —$OR_1$, or —$NH(R_1)$ or —$N(R_1)_2$ or —$R_1NHR_1NH_2$, and $R_4$ is $R_1$ or —$OR_1$, or —$NH(R_1)$ or —$N(R_1)_2$ or —$R_1NHR_1NH_2$.

A component of the sealant mixture may include components that can be represented as

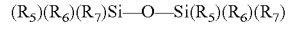

$R_5$, $R_6$ or $R_7$ are each any one of $R_1$, $R_2$, $R_3$ or $R_4$ where, $R_1$=is an alkyl radical of 1-4 carbon atoms or vinyl or —OH, $R_2$ is $R_1$ or —$OR_1$ or —$NH(R_1)$ or —$N(R_1)_2$ or —$R_1NHR_1NH_2$, $R_3$ is $R_1$ or —$OR_1$ or —$NH(R_1)$ or —$N(R_1)_2$ or —$R_1NHR_1NH_2$, and $R_4$ is $R_1$ or —$OR_1$ or —$NH(R_1)$ or —$N(R_1)_2$ or —$R_1NHR_1NH_2$.

The sealant mixture may also include a lubricant miscible with the organosilane and refrigerant for use in the system. The miscible mixture may include a lubricant selected from one or more of a polyol ester, polyalkylene glycol, mineral oil, polyalphaolefin and alkylbenzene. The miscible mixture may include a lubricant further comprising additives to enhance and refresh the performance of lubricant in the compressor.

The preferred embodiment of these and other aspects of the invention will be described later herein.

BRIEF DESCRIPTION OF THE DRAWINGS

For a better understanding of the present invention and to show more clearly how it may be carried into effect, reference will now be made, by way of example, to the accompanying drawings which show the preferred embodiment of the present invention and in which:

FIG. 1 is a graphic representation of a sealant injection assembly in accordance with a preferred embodiment of the present invention in use with an air conditioning or refrigeration system 1, FIG. 2 is a partially exploded perspective view of the assembly of FIG. 1, FIG. 3 is an end view of a fitting and orifice used in the assembly of FIG. 2.

DETAILED DESCRIPTION OF THE PREFERRED EMBODIMENT

Figure 4:
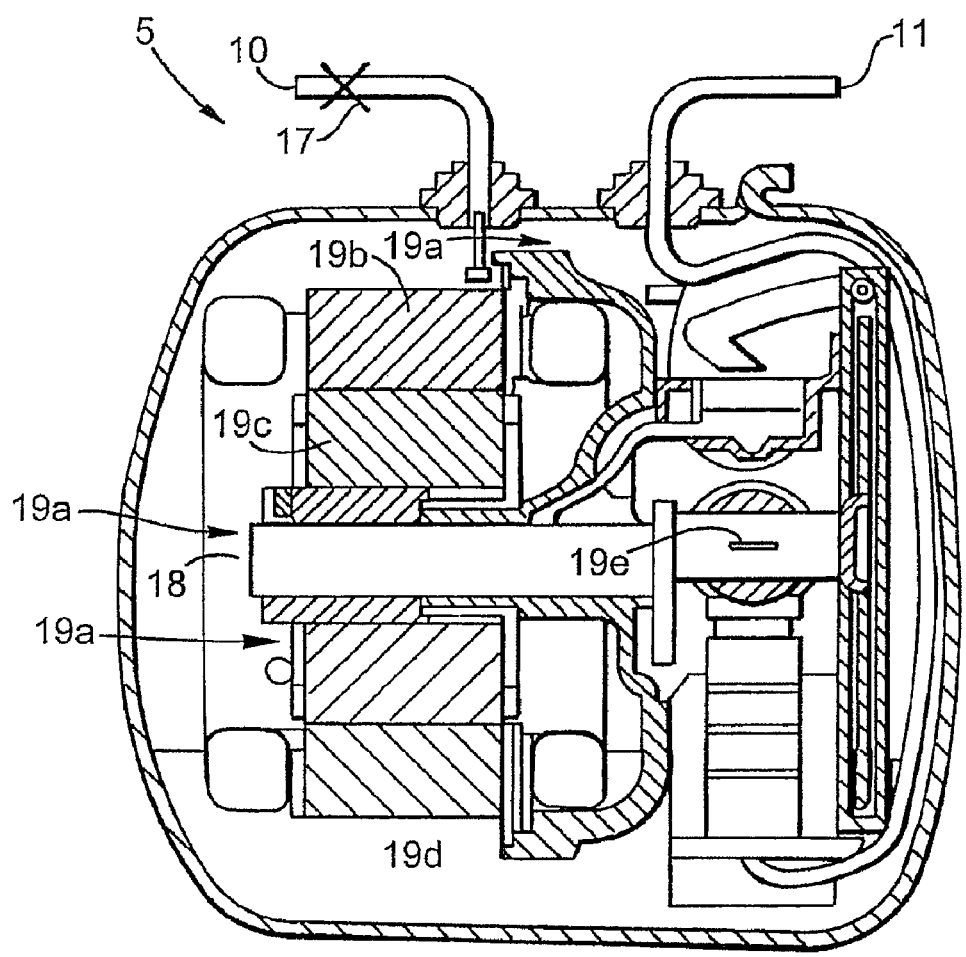
FIG. 4 is a cutaway view of a typical single cylinder hermetic compressor.

Referring to FIG. 1, a typical hermetically sealed air conditioning or refrigeration system 1 has an evaporator 3, compressor 5, condenser 7 and expansion device 9. The system 1 has a "low side" 10 consisting of the part of the system 1 between the expansion device 9 (for example, an orifice 9) and the suction line to the compressor 5. The compressor 5 draws in low pressure, low temperature refrigerant in a gaseous state from the "low side" 10. The compressor 5 compresses the gaseous refrigerant to a high pressure, high temperature gaseous state that flows to the condenser 7. The refrigerant passes through the condenser 7 and is cooled to a liquid state. The liquid refrigerant passes through the expansion valve 9, which causes the refrigerant to expand to a low pressure, low pressure temperature gas. The evaporator 3 absorbs heat from outside the system 1, and relatively low temperature, low pressure gas is reintroduced to the compressor 5.

For the test environment, the low side pressure is 77 psig at the compressor 5, and pressure on the high pressure side of the compressor (the discharge 11) is 256 psig. The temperature at the evaporator 3 is 45° F. and at the condenser 126° F. The ambient temperature is 90° F. The temperature of the gas between the valve 9 and evaporator 3 is 55° F. The temperature at the compressor 5 discharge 11 is 171° F. The valve 9 in the test environment had a diameter of 0.059 inches. The gas flow rate in the low side between the evaporator 3 and the compressor 5 is 1596 ft/min. The diameter of pipe in the low side is nominal ¾ inch, while the inside diameter of pipe at the discharge is ⅜ inches. This is for a single phase 2 ton compressor 5.

These are typical characteristics for an air conditioning system 1 or the environment about an air conditioning system 1. For larger and smaller systems 1, the particular specifications may change. This a design choice. The particular parameters under which sealant is introduced into the system may vary accordingly.

In order to seal small leaks in the system 1 it is desirable to introduce organosilanes or other sealants into the system 1. Organosilanes cure when in the presence of moisture, such as would occur at the situs of a leak.

The use of organosilanes in non-hermetically sealed air conditioning or refrigeration systems 1 is previously known, see for example, U.S. Pat. No. 4,237,172 issued 2 Dec. 1980 to Packo et al under title Sealing Leaks by Polymerization of Volatilized Aminosilane Monomers; U.S. Pat. No. 4,304,805 issued 8 Dec. 1981 to Packo et al under title Sealing Leaks by Polymerization of Volatilized Aminosilane Monomers; U.S. Pat. No. 4,331,722 issued 25 May 1982 to Packo et al under title Sealing Leaks by Polymerization of Volatilized Organosilane Monomers; and U.S. Pat. No. 5,417,873 issued 23 May 1995 to Packo under title Sealant Containing Partially Hydrolized Tetraalkoxy Silane, for Air Conditioning and Refrigeration Circuits that describe mixtures for this purpose. As previously mentioned, the simple injection of an organosilane or mixture of organosilanes into a hermetically sealed system 1 will typically cause compressor 5 failure.

Referring to FIG. 2, an injection assembly 12 has a vessel 15 containing an organosilane mixture. In the preferred embodiment the vessel 15 is a canister 15. The mixture is selected for miscibility with the contents of the system 1. It is to be recognized that, in addition to refrigerant, the system 1 contains a miscible lubricant for lubrication of the compressor 5. The system 1 may also have other contents, such as a fluorescent dye for leak detection. It may also contain a chemical dryer to remove moisture from the system 1.

The inventors have recognized that, in addition to liquid slugging, the introduction of greater concentrations of organosilanes remove lubricants from the compressor 5, resulting in compressor 5 failure. The organosilane should be introduced in sufficiently low concentrations and be miscible with the system 1 lubricant to avoid liquid slugging and to maintain sufficient lubricant for proper operation of the compressor 5. The organosilane is introduced from vessel 15 to a low side port 17 between the evaporator 3 and compressor 5.

The organosilane is introduced at a rate that allows the concentration of the organosilane to be diluted sufficiently by the other system 1 contents to prevent liquid slugging and to maintain sufficient concentration of lubricant for proper operation of the compressor 5.

Referring to FIG. 4, controlled injection of the organosilane combined with the miscible lubricant is critical when injected at the low side port 17 because of the close proximity between the low-side charging port 17 and compressor 5. After the organosilane/miscible lubricant mixture enters the compressor 5 along with cool refrigerant vapor it has to first pass by outboard shaft bearing 18. This aids in replacing oil to the outboard bearing which may have been stripped by passing refrigerant. The mixture continues on flow path 19a rushing over motor windings (stator 19b, rotor 19c) removing heat from the electric motor. The flow of refrigerant vapor/mixture is then drawn over oil reservoir (sump) 19d into compressor pump 19e where it is compressed into a hot vapor and discharged. During this flow path the importance of maintaining a suitable viscosity is important for a continued oil barrier between metal internals.

Many refrigeration and air conditioning systems use semi-hermetic or open seal (external drive) compressors and the type of compressor may be reciprocating (piston-cylinder), rotary, scroll, screw or centrifugal. While compressor geometry is critical to the hermetic systems as explained above, general engineering considerations also require control of flow rate, quantity and viscosity of the injected material for the other drives to ensure continued good operation and acceptable compressor life.

The organosilane can be introduced by many different methods. For example, it can be injected at a very slow rate while the compressor 5 is running continuously. This requires fine control over the injection rate. In order to allow increased rate of introduction, the organosilanes (or a portion thereof) can be injected into a running system 1, followed by a period of time during which the system 1 is stopped. The initial use of a running system 1 allows the organosilane to be distributed through the system 1. Stopping the system 1 allows the distributed organosilanes to further mix with the system 1 contents, without forcing areas of high organosilane concentration to flow through the compressor 5 repeatedly. This process can be repeated until all of the organosilane is introduced. Although this may allow for greater rates of introduction, the process would still be slow, and fine control is still required.

An alternative method of introducing the organosilane is to form an organosilane mixture by pre-diluting the organosilane in a material miscible with the system 1 contents and with the organosilane. This mixture is then introduced into the system 1 using one of the methods discussed above.

In the preferred embodiment, the organosilane is mixed with a lubricant to form the organosilane mixture. This has an additional benefit of maintaining lubricant in close proximity to the organosilane at all times. For increased flow control the viscosity of the organosilane mixture can be maintained within a selected range. Organosilane on its own has a very low viscosity (for example <1 cst. at 40° C.). This in part results in difficulty in controlling the flow of organosilane.

An additional method of injection would include the use of a fluid injector that can inject the mixture into the working low side system of the unit in small increments, an example include a Revolver™ sold by Cliplight Manufacturing Company of Toronto, Canada. The Cliplight device allows for approximately 0.04 of an ounce to be measured in at any one time. Additional amounts of the mixture depending on the system size could be accurately added. This would be an acceptable method of injection allowing only small amounts of the mixture into the suction gas path and thus preventing possible liquid slugging to the compressor 5.

Also, there are other modifications that could be made to an injection device. For example, a filter 16A could be added, as shown in FIG. 1, to the hose apparatus 16 to filter out any particles injected from the system 1 when charging the canister 15.

Further details of the preferred embodiment will be described.

Referring to the FIGS., the use of sealants based on organosilanes for refrigeration and air conditioning systems 1 is made possible by control of the rate of introduction and viscosity of the sealant mixture within certain ranges. An appropriate choice of organosilane sealant is made to allow effective sealing of small pinhole size leaks in the air conditioning or refrigeration system 1.

Preferably, the organosilane is chosen with several criteria in mind. The organosilane is miscible in the lubricant fluid; it is typically a monomer, but may contain oligomers, capable of forming a solid polymer with itself or other chosen organosilanes in the presence of moisture under the conditions of the particular application. The reaction rate of the organosilane or mixture of organosilanes is sufficient to form an effective seal at the situs of the leak. The polymeric seal is chosen to be sufficiently strong to maintain an effective barrier to prevent further leakage of refrigerant from the system 1. Also, the organosilanes are chosen to be stable in the absence of moisture, be non-corrosive and otherwise inactive to the components of system 1 and be generally environmentally acceptable. Further, the nature and injected quantity of the organosilanes is chosen, to the extent that it would interfere with the refrigerant and/or lubricant, so that such interference remains consistent with the normal operation of the refrigerant fluid e.g. vaporization and liquefaction characteristics.

The organosilane is combined with a miscible lubricant at particular ratios to provide the proper mixture viscosity for injection to the refrigerant system 1 to prevent bearing seizure. Specific orifice 20 (see FIG. 3) sizes are selected for an apparatus to ensure that the mixture is injected at flow rates required to prevent liquid slugging and subsequent compressor 5 shutdown or failure. In addition, certain procedures are performed for effective introduction of the mixture. Injection procedures are also described that reduce risk of temporary or catastrophic equipment shutdown. These include allowing the sealant mixture to cool to ambient temperatures before injection. Cooling permits better control over the flow rate of the organosilane component of the mixture.

Preferred components and compositions for the organosilane include those described in U.S. Pat. No. 4,237,172 issued 2 Dec. 1980 to Packo et al under title Sealing Leaks by Polmerization of Volatilized Aminosilane Monomers; U.S. Pat. No. 4,304,805 issued 8 Dec. 1981 to Packo et al under title Sealing Leaks by Polmerization of Volatilized Aminosilane Monomers; U.S. Pat. No. 4,331,722 issued 25 May 1982 to Packo et al under title Sealing Leaks by Polymerization of Volatilized Organosilane Monomers; and U.S. Pat. No. 5,417,873 issued 23 May 1995 to Packo under title Sealant Containing Partially Hydrolized Tetraalkoxy Silane, for Air Conditioning and Refrigeration Circuits.

Particular compositions for the organosilane are dependent on the selected criteria from those set out above. However the general nature of the organosilane can be represented as $(R_1)(R_2)Si(R_3)(R_4)$ where the preferred nature of the radicals is that $R_1$ is an alkyl radical of 1-4 carbon atoms or vinyl or —OH $R_2$ is $R_1$ or —$OR_1$ or —$NH(R_1)$ or —$N(R_1)_2$ or —$R_1NHR_1NH_2$ $R_3$ is $R_1$ or —$OR_1$, or —$NH(R_1)$ or —$N(R_1)_2$ or —$R_1NHR_1NH_2$ $R_4$ is $R_1$ or —$OR_1$, or —$NH(R_1)$ or —$N(R_1)_2$ or —$R_1NHR_1NH_2$ Other components which can be included are oligomers of the monomeric silanes described. One such example are the siloxanes:

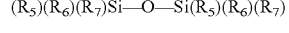

$(R_5)(R_6)(R_7)Si—O—Si(R_5)(R_6)(R_7)$

Where $R_5$, $R_6$ or $R_7$ may be $R_1$, $R_2$, $R_3$ or $R_4$

This composition was present at about 10% in the organosilane mixture used for experimental purposes where $R_5$ and $R_6$ were —$OCH_3$ and $R_7$ was either —$CH_3$ or vinyl.

These compositions are illustrative only as indicated by the patents cited for Packo et al. It is also recognized that not all silanes or combinations will meet each or all of the criteria set out above.

The lubricant is preferably chosen to be miscible with the organosilane mixture at ambient temperatures to provide proper control of the flow. Preferred lubricants would include those based on fluids such as polyolesters. Lubricants based on other fluids might be used. Those known to be miscible with organosilanes include, for example, mineral oils, alkyl benzenes and polyalkylene glycols.

Other fluids as alternatives to the lubricant or in combination with the lubricant may also be used provided that they result in an appropriate viscosity for the mixture and are compatible with contents of the system 1. In those other systems where the refrigerant is not a carrier for the lubricant, i.e. systems with separate refrigerant and lubrication circuits, these other fluids may also be added. The restrictions outlined elsewhere herein for high-side injection to a 6 vol % max per minute based on oil capacity also apply. These other fluids include, for example, drying agents, elastomer and metal conditioners, antioxidants, corrosion and rust inhibitors, anti-wear agents, metal deactivators, acid and base neutralizers, detergents, fluorescent and phosphorescent dyes and such. Drying agents include, for example, mono- and polyhydric alcohols, including glycols, preferentially mono-, di- and tri-hydric alcohols, organosilanes, or so-called orthoformates. Conditioners include, for example, methylene chloride and cyclohexanone. Antioxidants include those based on phenolic and aminic derivatives. Corrosion and rust inhibitors include, for example, esters of derivatives from succinic acid. Antiwear agents include, for example, sulphur and phosphorus derivatives. Metal deactivators include, for example, triazole derivatives. Acid and base neutralizers include, for example, buffering agents. Detergent additives include, for example, non-ionic detergents.

Other sealants, alternative to or in combination with organosilanes, may also be used. These sealants may consist of polymeric latexes, vinyl acetates, acrylonitriles, epoxide or methacrylates or some combination thereof. The sealant may include alkylene glycol. The sealant may contain a catalyst or accelerator. The catalyst may contain a copper or cobalt compound. The catalyst or accelerator may contain a solubilizer. The sealant may contain a filler. The filler may be graphite, carbon powder or a polytetrafluoroethylene.

Preferred compositions of the lubricant/organosilane mixture are those providing viscosities above a viscosity of 7 cst. when measured at 40° C. The choice of this viscosity minimum was determined by experiment as illustrated below in examples 4 to 7. The 40° C. measurement point is used simply because this is the temperature at which compressor lubricants are typically characterized for viscosity.

The quantity of organosilane to be added depends on the size of the refrigeration or air conditioning system. This is not due to the size or number leaks in the system. For small leaks, say less than 1/16" in diameter, and a sealant plug 1/16" long, several hundred seals would easily require only an ounce of organosilane. The rapidity with which a leak will seal depends on delivering an effective quantity of the sealant to the situs of the leak. This latter consideration, experience in automotive applications, and general practical considerations such as the size of the injection apparatus, suggest that injections of between 1/8 and 1 oz. of organosilanes are sufficient for most applications, with larger systems requiring the larger amount. In addition, it has been found that injections up to a maximum of 10% of the lubricant quantity in the system are recommended due to concerns with injection of liquid into the low side in proximity to the compressor.

In the preferred embodiment, organosilane is combined with a miscible lubricant. The quantity of lubricant mixed with the organosilane is determined by considerations of first, providing adequate lubrication as the fluid enters the compressor as has been previously described and second, of producing limited effect on the final lubricant viscosity, preferably no more than 10% reduction, once the organosilane has been distributed throughout the system.

The desired viscosity of the lubricant/organosilane mixture can be achieved by varying the ratio of the two or by adjusting the viscosity of the lubricant. Organosilanes of interest generally have very low viscosities (<1 cst.@40 C) while lubricants of interest are much higher in viscosity (10 to 220 cst. or more@40 C). The effect of the injected mixture on the final lubricant mixture depends on the injected viscosity as well as both the viscosity and quantity of oil in the system. Table 2 provides information on the range of characteristics of typical refrigeration and air conditioning systems. As described previously, the systems in Table 2 cover the range of compressor drives and types. The methods and considerations outlined in herein apply to all such systems.

TABLE 2

CHARACTERISTICS OF TYPICAL REFRIGERATION AND AIR CONDITIONING SYSTEMS

| SYSTEM CAPACITY (TON/HR.)* | TYPICAL APPLICATION | SUMP CAPACITY (OZ.) | OIL VISCOSITY RECOMMENDATION (CST. @ 40 C.) |
|---|---|---|---|
| 300-18,000 BTU/hr | Residential Commercial refrigeration, air conditioning | 10-30 | 10-32 |
| 18,000-60,000 BTU/hr | Residential Commercial refrigeration, air conditioning | 30-65 | 32, 46 |
| 60,000 BTU/hr (5 ton) –25 | Commercial, industrial refrigeration an air conditioning | 65-512 | 32, 46, 68 |
| 25+ | Industrial applications | 65-900 and greater | 46, 68 up to 220 |

*1 ton represents approximately 12,000 BTU

Given the wide range of possibilities represented in Table 2, it was found to be convenient to evaluate the effect of various injected lubricant viscosities, lubricant/organosilane ratios, oil sump size and oil sump viscosity by calculation of these factors. This process guides selection of the preferred viscosity and quantity of the injected mixture. The following serves to illustrate the process only.

The viscosity of a binary mixture of similar materials is often related to the viscosity of the components by the relation:

$$\ln \eta_{mix} = x_1 \cdot \ln \eta_1 + x_2 \cdot \ln \eta_2 + C \quad \text{(Equation 1)}$$

where:

ln is the natural logarithm $\eta_{mix}$ is the viscosity of the mixture $\eta_1$, $\eta_2$ are the viscosities of components 1 and 2 and $x_1$ and $x_2$ are the corresponding mole fractions C is a constant dependent on the nature of the components.

This equation has been found to predict the viscosity of organosilane/lubricant mixtures quite well for the current application. A similar relationship can be written for multi-component mixtures as well as for calculation of densities.

With component 1 taken as the injected material and component 2 as the original sump oil, Equation 1 can be rearranged to give the final viscosity of the mixture as:

$$\eta_{final} = \exp(x_{inj} \cdot \ln \eta_{inj} + x_{sump} \cdot \ln \eta_{sump} + C) \quad \text{(Equation 2)}$$

where $\eta_{final}$ is the final viscosity of the sump mixture after injection of the sealant mixture ln is the natural logarithm and exp is the exponential $x_{inj}$, is the mole fraction of injected material in the final sump mixture $x_{sump}$ is the mole fraction of the original sump oil in the final sump mixture $\eta_{inj}$, $\eta_{sump}$ are the viscosities of the injected material and original sump oil respectively and C is a constant dependent on the nature of the components.

With the limit that the final sump viscosity should not be lowered more than 10% compared to the original sump viscosity, then based on Equation 2, this amounts to a requirement that:

$$\exp(x_{inj} \cdot \ln \eta_{inj} + x_{sump} \cdot \ln \eta_{sump} + C) \geq 0.9 \eta_{sump} \quad \text{(Equation 3)}$$

Since the mole fraction of any component depends on the weight percent present for that component, then Equation 3 provides a basis for determining the desired viscosity and quantity limits on the injected material.

Of course, Equation 3 can be adjusted based on any selected limit on final viscosity other than the 90% of original sump viscosity used here.

$$\exp(x_{inj} \cdot \ln \eta_{inj} + x_{sump} \cdot \ln \eta_{sump} + C) \geq Fr \cdot \eta_{sump} \quad \text{(Equation 4)}$$

where Fr is the desired fraction of the original sump oil viscosity to be maintained.

Examples of these predicted effects using Equation 2 are shown for various situations in Table 3.

ous injections compared to the previous rows, allowing up to ⅗ of an ounce of organosilane to be injected while still maintaining final viscosity above 29 cst. Rows 11 and 12 give information for systems using 46 or 68 cst. lubricants in the sump.

An example of the use of this computational technique is the determination of the best combination of lubricant and organosilane to be injected by consideration of the system characteristics exhibited in Table 2. For example if a small unit with a 10 oz. sump contains 32 cst. lubricant, what should be the composition of the injected material using a 32 cst. lubricant and an organosilane mix? With 1 ounce injected, the maximum amount of organosilanes used here is calculated to be 0.175 of an ounce with the injected mixture having a viscosity of 12 cst. and the system lubricant having a final viscosity of 29 cst. At the minimum injected viscosity of 7

TABLE 3

VISCOSITY EFFECTS OF LUBRICANT/ORGANOSILANE MIXTURES ON REFRIGERATION SYSTEMS

|   | 1<br>Lubricant<br>Viscosity<br>in system<br>(cst. @ 40 C.) | 2<br>Lubricant<br>Viscosity<br>injected<br>(cst. @ 40 C.) | 3<br>System<br>Oil<br>Capacity<br>(oz.) | 4<br>Volume<br>Injected<br>(oz.) | 5<br>Viscosity of<br>Lube/Organosilane<br>Injected<br>(cst. @ 40 C.) | 6<br>Weight %<br>Lubricant<br>Injected | 7<br>Weight %<br>Organosilane<br>Injected | 8<br>Final Oil<br>Sump<br>Viscosity<br>(cst. @ 40 C.) |
|---|---|---|---|---|---|---|---|---|
| 1 | 32 | — | 10 | 1 | 0.6 | 0 | 100 | 18.7 |
| 2 | 10 | 32 | 10 | 1 | 10 | 76 | 24 | 9.9 |
| 3 | 32 | 32 | 10 | 1 | 15.6 | 87.5 | 12.5 | 29.9 |
| 4 | 32 | 32 | 30 | 1 | 10 | 79 | 21 | 30.7 |
| 5 | 32 | 32 | 30 | 1 | 7 | 71 | 29 | 30.2 |
| 8 | 32 | 32 | 50 | 1 | 10 | 79 | 21 | 31.2 |
| 9 | 32 | 32 | 50 | 2 | 10 | 79 | 21 | 30.4 |
| 10 | 32 | 32 | 50 | 3 | 10 | 79 | 21 | 29.7 |
| 11 | 46 | 32 | 65 | 3 | 10 | 79 | 21 | 42.2 |
| 12 | 68 | 32 | 512 | 3 | 10 | 79 | 21 | 66.9 |

As seen in row 1 of Table 3, the injection of 1 oz. of these particular organosilanes causes a drop in viscosity in a 10 oz. sump from 32 to below 19 cst. (all viscosities will refer to 40 C). A maximum drop in sump viscosity of about 10% is generally acceptable, corresponding to 29 cst. limit for units designed for 32 cst. viscosity oils. In such small systems, our testing indicates that this low viscosity material would cause bearing seizure. Rows 2 and 3 of Table 3 show that injection of organosilane blends with a 32 viscosity lubricant can provide satisfactory results. In row 2, it is indicated that 1 ounce of a mixture containing about ¼ ounce of an organosilane mixture and ¾ ounce of a POE lubricant having a viscosity of 32 cst. at 40 C combine to form a mixed viscosity of 10 cst. When this is injected into a system containing 10 ounces of a lubricant having a viscosity of 10 cst. at 40 C, the resultant sump viscosity of the mixture is expected to be just below 10 cst., at about 9.9 cst. at 40 C. This result is due to the effect of the molar fraction term in equation 1. Line 3 similarly shows that injecting ⅛ of an ounce of organosilane in 1 ounce of the lubricant/organosilane mix into such a system using a 32 cst. lubricant rather than a 10 cst. would produce a sump viscosity of 29.9 cst. This is above the suggested 29 cst. limit for this lubricant and would be an acceptable formulation. Rows 4 and 5 show information for systems using a 32 cst. lubricant and having a sump capacity of 30 ounces. Up to about ⅕ of an ounce of organosilane can be injected while still maintaining an injected viscosity of at least 7 cst. Rows 8, 9, and 10 indicate the diminishing effect of larger sump size with varicst., then 0.6 ounces of a mixture containing 28.7% organosilanes could be added to the 29 cst. final viscosity, representing 0.172 ounces which is slightly lower.

Table 4 gives examples of situations where the viscosity limit of lubricant (32 cst)/organosilane mix needs to be controlled above the minimum viscosity requirement of 7 cst. dependent on the total amount injected. For example, to maintain a 10 oz. system containing 32 cst. lubricant above 29 cst. after addition of 1 oz. of mixture, then the lubricant/organosilane mixture should be at a minimum viscosity of 12 cst. at 40 C which correspond to less than 0.175 oz. of organosilane in the 1 oz. of material injected. In the case of injecting 3 ounces of this lubricant/organosilane mix into a system containing 30 oz. of 32 cst. lubricant, then a similar minimum viscosity holds. The minimum viscosity for a larger system with 65 oz. of 46 cst. oil is limited to a maximum of 0.81 oz organosilanes when the total charge is 3 oz. in order to keep final viscosity above 41.4 cst. With the 65 oz. sump size, a unit using 68 cst. oil would be limited to a minimum viscosity injected of 17 cst. corresponding to just over ½ oz of silane in a 3 oz. total charge to maintain final viscosity above 61.2 cst. Dropping the injected charge to 2 oz. actually yields little benefit in organosilane injected in this case and also has a much lower injected viscosity for the injected material at the minimum injected viscosity.

TABLE 4

DEPENDENCY OF INJECTED VISCOSITY ON REFRIGERATION AND AIR CONDITIONING SYSTEMS

| Sump size (oz.) | Lubricant Grade in Sump | Injected Amount (oz)* | Minimum Viscosity Injected** (cst. at 40 C.) | Maximum organosilane injected (oz) |
|---|---|---|---|---|
| 10 | 32 | 1 | 12  | 0.175 |
| 30 | 32 | 3 | 12  | 0.525 |
| 65 | 46 | 3 | 8.2 | 0.81  |
| 65 | 68 | 3 | 17  | 0.51  |
| 65 | 68 | 2 | 7.6 | 0.6   |

*lubricant of 32 cst. at 40 C combined with organosilanes
**to 90% viscosity limit in sump viscosity It is not required that the viscosity of the injected lubricant be the same as the lubricating oils in the system, only that there be effective injection of the sealant and non-deleterious longer term effects. The effect of increasing the viscosity of the injected mixture using higher lubricant viscosity, however, is relatively small as seen in Table 5 which shows the effect of introducing an organosilane/POE lubricant mix into a unit designed to operate with a lubricant at 32 cst.

TABLE 5

EFFECT OF VARYING LUBRICANT VISCOSITY OF INJECTED ORGANOSILANE MIXTURE INTO SYSTEM USING 32 CST. POE LUBRICANT*

|   | Injected Viscosity (cst@40 C.) | Wt. % POE | Wt. % Organosilane | Viscosity Injected (cst@40 C.) | Final System Viscosity (cst. @ 40 C.) |
|---|---|---|---|---|---|
| 1 | 32 | 79 | 21 | 10 | 28.5 |
| 2 | 46 | 79 | 21 | 13 | 29.0 |
| 3 | 68 | 79 | 21 | 17 | 29.6 |

*10 oz. sump capacity, 1 oz. injected

The application of Equations 1-4 allows calculation of the most desirable mixture of lubricant and organosilane to be used for any specific situation in terms of the size of the unit (oil capacity) and viscosity of the sump oil. The minimum ratio of lubricant to organosilane is predetermined by the minimum allowable injected viscosity and the individual viscosities of the lubricant and organosilane in the injected mixture. The viscosity of mixtures relate exponentially to component viscosities and in ratios dependent on mole fractions rather than simple weight fractions. In addition, it is recognized that the molecular nature of the lubricant affects the relation between viscosity and molecular weight so that the examples presented here are not to be taken as representing the only possible trends.

These examples demonstrate that the application of the techniques described herein is not limited to fluids of a particular viscosity except as related to effective injection and longer term operation of the system particularly as related to the compressor.

Some systems operate with a lubricating subsystem that is independent of the refrigerant. In this case, organosilanes alone are injected into the refrigerant circuit.

It is also possible to inject organosilanes alone in systems where the lubricant is carried by a miscible refrigerant. In this case, the organosilane alone, or in a mix with lubricant, can be injected into the high side of a refrigeration system while the unit is operating up to a maximum of 6% per minute of the systems total oil content. For example, a system with a 50 oz oil capacity could be injected up to a rate of 3 oz/min. of organosilanes. The quantity injected remains limited by the foregoing based on limits to reduction in sump viscosity. After 6% is exceeded, there will be a decreased level of compressor performance due to higher discharge temperature resulting in possible decreased oil return to the low side of compressor eventually damaging the shaft bearings. Injecting at a rate above 8% per minute of the total oil system's content will likely result in loss of effective heat transfer, decreased bearing lubrication and possible catastrophic compressor failure. It is recognized that the 6% and 8% amounts are for typical systems and there are likely systems that can exceed these thresholds while falling within the principles described herein.

The sealant could also be injected into the high side of the unit while it is out of service and in a vacuum state with all refrigerants removed. Once injected into the high side, the system is recharged using refrigerant gas or liquid into the high-side up to at least 60% of the systems full charge. This is carried out while the unit is turned off. The system is then allowed to completely equilize before turning the unit on and topping off the required system's charge.

These methods can be utilized regardless of the class of compressor. In the preferred embodiment, injection of the lubricant/organosilane mixture is accomplished through the use of a sealed canister 15 and a coupling hose assembly 16 that is first fitted to the canister 15 and then to the inactive refrigeration system 1 through an injection port 17 on the low-pressure side of the compressor 5.

The canister 15 can be pressurized before the canister 15 is sealed. The pressure in the canister 15 causes the sealant mixture to enter the system 1 when the canister is opened, there is fluid connection to the system 1, and the system 1 is running to cause "low side" 10 pressures to drop. In test environment the canister 15 was not pre-pressurized as will be explained below; however, a charged pressure of 100 psig was found to be acceptable for allowing the sealant mixture to enter the system 1 in the test environment, where the low side pressure was 77 psig as mentioned previously.

Alternatively, the sealed canister 15 can have a pressure near, at or below ambient. The canister 15 can be charged (pressurized) using the system 1 pressure. First the system 1 is turned off and pressure within the system 1 is allowed to equalize. In the test environment, this results in an overall system 1 pressure of approximately 100 psig. The canister 15 is then placed in fluid connection with the system 1. This causes the canister 15 to be pressurized to approximately 100 psig. The system 1 can then be run. This causes the pressure in the low side 10 to drop. The higher pressure within the canister 15 causes the sealant mixture to enter the system 1.

Using a non-pressurized canister 15 as described above is preferred as such containers are less hazardous. This means, for example, that they are transportable without having to comply with the strict transportation regulations applicable to pressurized containers.

More details of a preferred method used in the test environment will now be described. Before use, the canister 15 is at a pressure of about 20 inches of mercury vacuum. The vacuum is a result of packaging processes that ensure much of the air is removed from the canister 15 before it is sealed. Hose assembly 16 is evacuated and then the canister 15 seal is broken using a can-tapper 21 that is built into the hose assembly 16 in such a way that refrigerant mix from the system 1 is allowed into the canister 15 until pressures are stabilized, and the canister 15 is charged. The can-tapper 21 has a manually operated valve (see valve handle 25 below) for fluid connection (open) and fluid disconnection (closed) of the canister 15 from the system 1. It also has a tapping pin (operation described below) for unsealing the canister 15 (which is also required for fluid connection when the canister 15 is sealed). The can-tapper 21 is also a fitting for sealed fluid connection to the canister 15, typically by way of compatible threads in the can-tapper and on the canister 15, and corresponding seals, such as a rubber gasket or an o-ring.

The addition of canister 15 contents to the refrigerant system 1 is controlled to a maximum flow rate of about 6 cc/sec which in the preferred embodiment is obtained through the use of orifice 20 having a maximum diameter of about 0.06 in. One such arrangement is shown in FIG. 2. Although there is no minimum flow rate required, the minimum orifice size should be about 0.02 inches in diameter to avoid orifice plugging due to contamination from particles from system 1 as the canister 15 is charged. This minimum restriction could be removed by the inclusion of a filter, such as filter 16A of FIG. 1, in the injection hose between the fitting 22 and the injection port 17.

The orifice 20 is located within fitting 22 of FIG. 2. In the test environment an orifice of 0.0292 inches diameter was successful. The hose assembly 16 has a hose 23 between the can-tapper 21 and the fitting 22.

Surprisingly, it has been found that the action of filling the canister 15 with refrigerant upon tapping the canister 15 and opening a valve in the tapper 21 causes the canister 15 and its contents to heat to temperatures well above ambient. Temperatures of 135° F. were encountered in tests. This may affect the flow rate of the organosilane as it enters the system 1. In the preferred embodiment, the canister 15 is fluidly disconnected after charging and the system 1 is run. Then the canister 15 is again fluidly connected to the system 1. This allows the system 1 to achieve full low side 10 pressure that will best allow the sealant mixture to enter the system 1.

As there is a period of time between disconnecting and re-connecting the canister 15, the canister 15 should be allowed to cool to at or near ambient temperature while still fluidly connected to the non-running system 1. If not, then charge in the canister 15 may be lost as pressure will drop with the temperature in a closed canister 15.

Also, the contents of the canister 15 should enter the cooler suction gas stream with as close to ambient temperature of the system 1 as possible so as not to effect the volume of the cooler gas going to the compressor 5. A compressor 5 generally requires at least a four percent return of oil to maintain adequate lubrication on metal-to-metal surfaces. In practical terms, a residential system 1 operating at a suction pressure of 70 psig will typically have a corresponding evaporator 3 saturation temperature of 41 degrees F. If the system 1 is operating satisfactorily then the actual suction line 10 temperature should be approximately 51 degrees F. This is due to an extra 10 degrees of superheat picked up during the expansion. Elevating this temperature momentarily could cause an erratic expansion of gas followed by contraction resulting in a cavitation effect on the compressor 5. Experiments show a fluctuation in low-side and high-side pressures when the product has not been sufficiently cooled. Rapid changes of pressure can damage compressor valves and discharge excess oil from the compressor sump into the high-side line. This excess oil will begin to log and affect downstream conditions such as temporary high discharge pressures accompanied by temporary low-side pressure. The percentage of required oil to be carried back could lower to the point of not supplying adequate lubrication to metal-to-metal contact causing damage to the compressor 5.

These and other steps in the procedure of the preferred embodiment are described in Table 1.

TABLE 1

1. Turn off A/C system 1 and allow enough time for refrigerant to equalize in system 1.
2. Confirm that can-tapper 21 piercing pin is fully retracted below seating washer. (Turn valve handle 25 counter-clockwise, opening the valve in the tapper 21)
3. Thread canister 15 onto can-tapper 21 by turning clockwise. Be careful not to cross thread or over tighten.
4. Thread female fitting 22 onto vacuum pump, not shown, and draw vacuum for approximately 1 minute to eliminate air in tap hose 5.
5. Remove female fitting 22 from vacuum pump while it is running to maintain vacuum in tap hose 5. After disconnecting shut down vacuum pump.
6. Thread female fitting 22 onto low side service port 17 immediately after removing from vacuum pump.
7. Turn can-tapper 21 piercing handle 25 clockwise until it stops. (This action pierces the can, and closes the valve in the can-tapper 21.)
8. Hold canister 15 upside down and above the low side service port 17. Turn handle 25 counter-clockwise (open the can-tapper valve and provided fluid connection between the canister 15 and the system 1) slowly allowing the system 1 refrigerant to fully charge canister 15. The canister 15 will become warm once the refrigerant mixes with its contents. Allow the canister 15 to dissipate the additional heat of charging which should take between 5 to 10 minutes depending on system 1 charge and ambient air conditions. When the can's temperature has equalized with ambient air conditions then proceed with next step. Be sure to check that all connections from canister 15 to system 1 are secure and that there is no leakage occurring.
The primary reason for inverting the canister is to simplify the procedure for the technician. If the technician forgets to invert the canister before injection into the air-conditioning unit (see 10. below) then the transfer of the mixture would not be successful because of the gas on top and the heavier liquid residing on the bottom of the can. The connection to the low-side charging port is made with the canister inverted for charging and injection as one-step. This also limits stressing the hose assembly by changing position while under pressure. Having the gas first pass through the mixture also helps to mix the contents of the mixture if possible stratification occurred between the organosilane and the miscible lubricant.
9. Turn handle 25 clockwise until it stops, isolating charged canister 15 from A/C or R system 1.
10. While holding the canister 15 upside down turn on A/C system 1. Slowly turn handle 25 counter-clockwise gradually releasing sealant into the system 1. This should take approximately 3 to 5 minutes.

TABLE 1-continued

Releasing sealant too quickly could result in liquid slugging. Shake canister 15 gently to determine when empty. If all of the contents in canister 15 are not emptied after 5 minutes then turn canister 15 tapper 21 piercing handle 25 clockwise until it stops. Turn of A/C or R system 1 and repeat steps 8, 9 and 10.

11. Once canister 15 is empty remove female fitting 22 from low side service port 17, then shut down A/C system 1. Allow system 1 pressure to equalize. The A/C or R system 1 should be left off for approx. 5 minutes. This procedure allows product to mix with systems 1 oil and when the system 1 is restarted will allow for equal distribution throughout system 1.

In typical experiments performed during the course of the current development, a canister was used with approximate dimensions of 5 cm. diameter and 10 cm height and this contained about 89 cc (3 oz.) of a lubricant/organosilane mix. With the canister 15 filled with refrigerant and inverted at ambient conditions, this would produce a lower column of liquid about 4.5 cm. high covered with a gaseous column of refrigerant 5.5 cm. in height. The pressure exerted by the refrigerant was around 120 psi and this was then injected into a system operating at 66 psi. Thus the driving force for injection of the liquid phase into the system was about 54 psi.

In an ideal situation the equation $$Q = C_d \times A \times (2 \times \Delta P/\rho)^{1/2} \quad \text{(Equation 5)}$$

could be applied where
Q is flow rate
$C_d$ is the coefficient of discharge
$\Delta P$ is the differential pressure, and
$\rho$ is the fluid density.

Experiments in transparent glass vessels showed the expected result that the liquid actually contained bubbles of refrigerant. Nevertheless, considering the ideal one-phase flow situation, equation 5 can be applied to obtain at least a model of the injection process. For an orifice of 0.029 inches in diameter, the canister was found to empty in about 90 sec. This corresponds to a coefficient of discharge of 0.37. Experiments showed that satisfactory injections could be made using orifice sizes up to about 0.060 inches. This corresponds to an initial flow rate of 6 cc/sec and a final flow rate of 4 cc/sec for the last fraction of the liquid.

Considerations of system size relate to the effect on viscosity of the lubricant in the system which tends to increase with the size of the system itself. System size is typically measured in tons—a measure if the cooling capacity of the system 1 (1 ton is equivalent to the delivery of 12,000 BTU cooling capacity per hour). General consideration of these factors provide "rules of thumb" to guide quantities of organosilane mixture to be added. For example, one scenario suggests for units above 5 tons capacity, a mixture about 7-8 cst. @40 C is appropriate and about 10 cst. for smaller units. The actual total quantity of lubricant/silane mix is dependent on ensuring effective delivery of sealant material to the situs of the leak. Typically, units below 1 ton should require about ⅛-¼ oz. of organosilane and larger units 12-1 oz. The total quantities of the mixture will also depend on the practicality of the details of the injection system being used. The viscosity of the mixture and the quantity of organosilane can be adjusted within these general guidelines.

EXAMPLES

The principles described herein are further illustrated in the following examples, but the scope is not limited by these examples.

Test Methods

The general test apparatus is shown schematically in FIG. 2 and represents the basic components of a typical refrigeration system 1. A refrigerant gas (R-22 was used in the test environment; however, R134a and other refrigerants could also be used) is circulated by means of a hermetically sealed electric motor and compressor 5. The gas is cooled to liquid by means of a condenser 7; the liquid passes through valve 9 and then through an evaporator 3 where the liquid is regenerated to a gas accompanied by the desired cooling effect. The gas then returns to the compressor 5 for repeating cycles of the process.

Sealant and mixtures were added by the procedure represented in Table 1 to the low pressure (suction) side of the compressor 5.

Sealant

In the base case, simple injection of the organosilane sealant in the low side port 17 was shown not to be appropriate for hermetically sealed refrigerant compressor 5 systems 1.

Example 1

In a laboratory test, a 2 ton vertical hermetic single phase refrigeration system 1 with a full refrigerant load was loaded to simulate an ambient temperature above 32° C. An organosilane mixture was injected into the circuit and the compressor 5 failed after only one further hour of operation due to bearing seizure.

Example 2

In another set of tests, two 2 ton single phase piston type systems 1 were injected with a mixture of commercial organosilane and immiscible lubricating oil. Failure occurred in one system 1 after 10 minutes and after 1 hour in the second case.

Example 3

Two small 10,000 BTU packaged refrigerant systems 1 were tested. Both failed within 10 hours. Subsequent examination of these systems 1 showed that failure was due to lack of oil to the upper sleeve bearing, referred to as the compressor 5 outboard bearing.

Sealant Viscosity

The effect of sealant viscosity was investigated by varying the ratios of organosilane and lubricating oil in the sealant mixture.

Example 4

Mixtures of organosilane sealant (viscosity <1 cst@40° C.) and immiscible compressor 5 oil (viscosity 68 cst.@40° C.) caused bearing seizure in all five cases in Examples 1, 2, and 3.

Example 5

Use of straight organosilane mixture caused compressor 5 bearing seizure within one hour in a test with the 2 ton system 1.

Example 6

A test was performed using a 0.029 in. orifice 20 to inject a 3 fl. oz. mixture consisting of 3 parts of a commercial polyolester refrigeration compressor 5 oil and 1 part of an organosilane sealant such that the mixture had a viscosity of 8 cst.@40° C. The oil capacity of the single phase hermetically sealed 2 ton system 1 was 55 oz. The system 1 was injected with the organosilane/oil mixture with no change in amperage of the motor, indicating no liquid slugging. The system 1 was run successfully for 12 days until shut down deliberately.

Example 7

A test was performed similar to that described in Example 6 except that the mixture injected consisted of 2 parts of the commercial polyolester refrigeration compressor 5 oil and 1 part of the organosilane sealant to give a mixture viscosity of 11 cst.@40° C.

A start/stop test was run with 60 start/stops over a 3½ hr. period. This is a severe test due to the surge of electricity required to start the spinning of the rotor of the motor and also due to some initial loss of oil from the inboard bearing at each start. The test was successful with no change in operating variables and the system 1 ran for an additional 13 days with excellent operation until it was deliberately shut down.

Rate of Injection

Controlled rate of introduction of the organosilane/oil mix was investigated as a variable. The hose assembly shown in FIG. 2 was used to introduce mixtures into a 2 ton refrigeration system 1 fitted with an oversized 2½ ton condenser 7. The can-tapper 21 at one end of the hose seals and punctures a canister 15 containing the sealant. The fitting 22 at the other end is attached to the refrigeration system 1 and low-side port 17 is opened to allow the sealant mixture to enter the refrigeration system 1 through an orifice 20. The size of this orifice 20 affects the injection rate of the sealant.

Example 8

Using an orifice 20 size of 0.094 in., it was found that the rate of addition of the sealant/oil mixture caused fluctuations in suction and discharge pressure of the system 1. As previously mentioned this upset condition can cause the compressor to momentarily discharge from the sump into the discharge line causing logging possibly affecting oil return to the suction side of the compressor and eventual bearing failure. Any needle valve associated with the orifice 20 would not allow sufficient additional fine control to overcome this problem.

Example 9

A capillary tube was used to control introduction of the sealant. An orifice 20 size of 0.055 in. was found to allow successful introduction of the sealant into the above refrigeration system 1. The system 1 ran for 18 days with no change in operating variables before it was deliberately shut down.

Example 10

Inserting an orifice 20 size of 0.029 in. into the system 1 described in Example 8 was tested and found to give successful injection of organosilane/oil mixes.

Quantity of Injection

Smaller systems are of the greatest concern for susceptibility to the rate and quantity of injection The two examples below were injected with a mixture consisting of ¼ oz of polyolester lubricating oil and $V_4$ oz of a silane mixture having a total viscosity of 9.8 cst. at 40 C using the injection technique outlined in Table 1. In each case, the sump originally contained 10 oz. of polyalkylene glycol lubricant having a viscosity of 32 cst. at 40 C. Examples 11 and 12 below support an injection limit of up to 10 vol % of sealant mixture, bases on sump oil charge, can be injected into refrigeration or air conditioning systems. In addition, it is apparent in these examples that the refrigerant charges are extremely small (3.70 and 1.69 oz) but that the additional 10 vol % liquid has had no effect on the thermal efficiencies of the units.

Example 11

DANBY Model DCR433W
Refrigerant—134A
Charge—105 g
AMPS—1.1
Procedure: Bullet piercing valve installed
Conditions: Base of compressor—101 F to 104 F 0.87 AMPS
Suction temp—72 F
Discharge temp—101 F
Inside panel—freezer 0 to 2 F (Temperature glide effect)
Allow 3 min to fill can
5 min cool down
Allow 5 min run then switch to off
After stop time, put in operation
After 90 days, the system continued to run successfully.

Example 12

Unit: GE with Matsushita SB30C50GAU6 compressor
Refrigerant 134A
Charge 1.59 ounces
Procedure: Bullet piercing valve installed
Conditions: Base of compressor—90 F 0.88 AMPS
Suction temp—70 F
Discharge temp—102 F
Inside—panel—freezer—4 F to 5 F
Allow 3 min to fill
5 min cool down
Allow 5 min run then switch off
After stop time, put in operation
After 90 days, the system continued to run successfully

Injection Procedures

As outlined in Table 1, the typical procedure used to inject mixtures into the refrigeration system 1 involves opening the canister 15 containing the oil/organosilane mixture to a low pressure port 17 just prior to the non-operating compressor 5. The mixture is at a pressure near 20 inches of mercury vacuum before opening to the refrigerant system 1 which is typically near 100 psig. The entry of the refrigerant into the mixture in the canister 15 causes a heating effect and raises the canister 15 and contents to about 25° C. above ambient. Single phase systems 1 are particularly susceptible to this effect since entry of the hot mixture into the refrigeration system 1 would cause momentary heating of the suction vapor and a decrease in the vapor's density. This in turn affects the ability of the vapor to cool the motor and other mechanical parts.

Therefore as part of the procedure to inject the mixture from the canister 15, it is important to allow the refrigerant/sealant mixture to cool before introduction into the refrigeration system 1.

Variations and modifications can be made without departing from the spirit of this invention. It should be understood that the form of the invention described above, including the Figures and Tables, is illustrative only and is not intended to limit the scope of the present invention.

It will be understood by those skilled in the art that this description is made with reference to the preferred embodiment and that it is possible to make other embodiments employing the principles of the invention which fall within its spirit and scope as defined by the following claims.

We claim:

1. A method for injecting sealant into a charged air conditioning or refrigeration system having a compressor, a high pressure side ("high side"), and a low pressure side ("low-side"), the method comprising:
   injecting the sealant into the low pressure side of the system during operation of the charged air conditioning or refrigeration system in a quantity to provide sufficient lubrication to maintain proper operation of the compressor when the sealant is fully distributed in the system, while
   injecting the sealant at up to a maximum controlled rate controlled by a second orifice that is separate from and smaller than a first orifice created by a piercing valve, so as to maintain proper operation of the compressor before the sealant is fully distributed in the system.

2. The method of claim 1, wherein the sealant comprises an organosilane.

3. The method of claim 2, wherein the organosilane comprises a monomer capable of forming a solid polymer with itself or other chosen organosilanes in the presence of moisture, and is stable in the absence of moisture, and does not substantially interfere with the normal operation of other contents of the system in selected quantities.

4. The method of claim 1, wherein the sealant is part of a fluid mixture further comprising a lubricant.

5. The method of claim 4, wherein the viscosity of the mixture is not less than 7 CST @ 40° C.

6. A method of introducing sealant into a charged air conditioning or refrigeration system having a compressor and evaporator, the method comprising the steps of:
   connecting a vessel containing a sealant mixture comprising an organosilane between the compressor and the evaporator, and
   while the system is running, allowing the sealant mixture to enter the charged air conditioning or refrigeration system up to a maximum controlled rate controlled by a second orifice that is separate from and smaller than a first orifice created by a piercing valve to prevent liquid slugging and to maintain sufficient concentrations of lubricant for proper operation of the compressor during the injection process,
   allowing the sealant to enter the system in an amount to maintain sufficient compressor lubricant viscosity for continued proper operation of the compressor, and
   allowing the sealant to enter in an amount that will allow continued proper operation of the air conditioning or refrigeration system.

7. The method of claim 6, wherein allowing the sealant mixture to enter the system comprises pressurizing the sealant mixture sufficiently above system low side operating pressure to cause the sealant mixture to enter the system from the vessel when the system is running.

8. The method of claim 7, wherein pressurizing the sealant mixture comprises using the system pressure of the system in a non-running state to pressurize the sealant mixture in the vessel.

9. The method of claim 8, further comprising a step of allowing the sealant mixture to cool to near ambient temperature after the vessel is pressurized and while the vessel is fluidly connected to the system in the non-running state.

10. A method of introducing sealant into a charged air conditioning or refrigeration system having a compressor and an evaporator, the method comprising the steps of:
    a) turning off the charged air conditioning or refrigeration system;
    b) allowing system pressure to equalize;
    c) connecting a vessel containing a sealant mixture comprising an organosilane between the compressor and the evaporator, and
    d) while the system is running, allowing the sealant mixture to enter the system up to a maximum controlled rate controlled by a second orifice that is separate from and smaller than a first orifice created by a piercing valve to prevent liquid slugging and to maintain sufficient concentrations of lubricant for proper operation of the compressor
wherein, the organosilane is a monomer capable of forming a solid polymer with itself or other chosen organosilanes in the presence of moisture, and is stable in the absence of moisture in the system, and does not substantially interfere with the normal operation of contents of the system in selected quantities.

11. The method of claim 10, wherein the step of connecting the vessel further comprises providing fluid connection between the vessel and the system, and the method further comprises allowing sufficient time for the sealant mixture to achieve ambient temperature before running the system after fluid connection.

12. The method of claim 10, wherein the sealant mixture has a viscosity above 7 CST when measured at 40° C.

13. The method of claim 12, wherein the maximum controlled rate is 6 cc/sec.

14. The method of claim 11, wherein the step of connecting the vessel to the system comprises connecting a hose assembly between the vessel and a low pressure side service port of the system.

15. The method of claim 14, comprising the step of substantially evacuating the hose assembly prior to connection to the system.

16. The method of claim 1, 6 or 10, wherein the controlled rate is a maximum flow rate of 6% per minute of a total oil content of the system.

17. The method of claim 1, 6 or 10 wherein the controlled rate is controlled through the second orifice having an opening within a range of from 0.020-0.06 inches.

18. A device for introducing sealant into a hermetically sealed, charged air conditioning or refrigeration system, the device comprising:

a) a sealed vessel, and b) in the sealed vessel, an organosilane mixture of an organosilane and a miscible material, the mixture having a viscosity above 7 CST when measured at 40° C., wherein the organosilane is a monomer or oligomer capable of forming a solid polymer with itself or other chosen organosilanes in the presence of moisture, and is stable in the absence of moisture in the charged air conditioning or refrigeration system, and does not substantially interfere with the normal operation of contents of the system in selected quantities, further comprising a metering device for fluid connection with the sealed vessel, and for controlling fluid flow from the sealed vessel up to a maximum controlled rate controlled by a second orifice that is separate from and smaller than a first orifice created by a piercing valve.

19. The device of claim 18, wherein the second orifice has an opening within a range of from 0.020-0.06 inches.

20. The device of claim 19, further comprising a fitting for sealed fluid connection to a low side port of the system, and wherein fluid flowing through the second orifice also flows through the fitting.

21. The device of claim 18, further comprising a hose assembly having a first fitting for sealed fluid connection to a low side port of the system, and having a sealed fluid connection to the sealed vessel.

22. The device of claim 21, wherein the second orifice controls fluid flow from the sealed vessel through the hose assembly.

23. The device of claim 22, wherein the fluid connection to the sealed vessel comprises a second fitting.

24. The device of claim 23, wherein the second fitting comprises the piercing valve, which piercing valve comprises a manually operable valve for providing fluid connection between the hose assembly and the sealed vessel.

25. The device of claim 18, wherein fluid flow is of a maximum of 6% per minute of a total oil content of the system.

26. The device of claim 18, wherein the fluid flow is of controlled through the second orifice having an opening within a range of from 0.020-0.06 inches.

27. A device for introducing sealant into a hermetically sealed air conditioning or refrigeration system, the device comprising: a sealed vessel, and, in the sealed vessel, an organosilane mixture of an organosilane and a miscible material, wherein the organosilane is a monomer or oligomer capable of forming a solid polymer with itself or other chosen organosilanes in the presence of moisture, and is stable in the absence of moisture in the system, and does not substantially interfere with the normal operation of the contents of the system in selected quantities, the device further comprising means for introducing the mixture from the sealed vessel into a low pressure side port of the system, wherein such means comprises a second orifice that is separate from and smaller than a first orifice created by a piercing valve to control the rate of introduction of the mixture up to a maximum controlled rate.

28. The device of claim 27, wherein the mixture has a viscosity above 7 CST when measured at 40° C.

29. The device of claim 27, wherein the rate of introduction of the mixture is controlled to be a maximum of 6% per minute of a total oil content of the system.

30. The device of claim 27, wherein the second orifice has an opening within a range of from 0.020 to 0.06 inches.

* * * * *